United States Patent
Rytkönen et al.

(10) Patent No.: US 12,474,366 B2
(45) Date of Patent: Nov. 18, 2025

(54) THREE-AXIS ACCELEROMETER WITH TWO MASSES

(71) Applicant: Murata Manufacturing Co., Ltd., Nagaokakyo (JP)

(72) Inventors: Ville-Pekka Rytkönen, Klaukkala (FI); Anssi Blomqvist, Helsinki (FI); Matti Liukku, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 383 days.

(21) Appl. No.: 18/154,409

(22) Filed: Jan. 13, 2023

(65) Prior Publication Data
US 2023/0228790 A1 Jul. 20, 2023

(30) Foreign Application Priority Data
Jan. 19, 2022 (FI) .................................... 20225041

(51) Int. Cl.
*G01P 15/125* (2006.01)
*G01P 15/08* (2006.01)
*G01P 15/18* (2013.01)

(52) U.S. Cl.
CPC ............ *G01P 15/125* (2013.01); *G01P 15/18* (2013.01); *G01P 2015/0814* (2013.01); *G01P 2015/0831* (2013.01); *G01P 2015/0857* (2013.01)

(58) Field of Classification Search
CPC ................... G01P 15/18; G01P 15/125; G01P 2015/0814; G01P 2015/0831; G01P 2015/0857
See application file for complete search history.

(56) References Cited

U.S. PATENT DOCUMENTS

| | | | |
|---|---|---|---|
| 9,246,017 B2 * | 1/2016 | van der Heide | ........ G01P 15/08 |
| 2008/0092652 A1 | 4/2008 | Acar | |
| 2009/0183570 A1 | 7/2009 | Acar et al. | |
| 2010/0037690 A1* | 2/2010 | Gunthner | ........... G01C 19/5712 29/829 |
| 2012/0017677 A1* | 1/2012 | Merz | ................. G01C 19/5719 73/504.12 |
| 2013/0125649 A1* | 5/2013 | Simoni | ................... G01P 15/18 73/504.04 |
| 2013/0192364 A1* | 8/2013 | Acar | ....................... G01P 15/18 73/504.12 |
| 2014/0352431 A1* | 12/2014 | Leclerc | ................... G01P 15/18 73/504.04 |
| 2017/0023608 A1 | 1/2017 | Tang et al. | |
| 2017/0363655 A1 | 12/2017 | Zhang | |
| 2018/0172447 A1* | 6/2018 | Prikhodko | .............. G01P 15/14 |

(Continued)

FOREIGN PATENT DOCUMENTS

DE 102019216535 A1 4/2021

*Primary Examiner* — Helen C Kwok
(74) *Attorney, Agent, or Firm* — ArentFox Schiff LLP

(57) ABSTRACT

An accelerometer comprising a first proof mass and a second proof mass which are coupled to each other with a coupling structure which extends from the first proof mass to the second proof mass. The coupling structure synchronizes the movement of the first and second proof masses so that the first and second proof masses may be linearly displaced from their rest position in the x-direction, rotationally displaced in opposite in-plane directions and rotationally displaced in opposite out-of-plane directions.

20 Claims, 11 Drawing Sheets

(56) References Cited

U.S. PATENT DOCUMENTS

| | | | |
|---|---|---|---|
| 2018/0275161 A1* | 9/2018 | Tang | G01P 15/18 |
| 2019/0383612 A1* | 12/2019 | Geisberger | G01C 19/5747 |
| 2020/0096538 A1* | 3/2020 | Zhang | G01P 15/125 |
| 2020/0132716 A1* | 4/2020 | Zhang | G01P 15/125 |
| 2020/0200534 A1 | 6/2020 | Kuisma et al. | |
| 2021/0072280 A1* | 3/2021 | Liukku | G01P 15/125 |
| 2021/0381834 A1* | 12/2021 | Gregory | G01C 19/5719 |

* cited by examiner

THREE-AXIS ACCELEROMETER WITH TWO MASSES

CROSS REFERENCE TO RELATED APPLICATIONS

This application claims priority to Finnish Patent Application No. 20225041, filed Jan. 19, 2022, the entire contents of which are hereby incorporated by reference in its entirety.

TECHNICAL FIELD

The present disclosure relates to microelectromechanical (MEMS) devices that measure acceleration, and particularly to devices for measuring acceleration in three orthogonal directions. The present disclosure further concerns the use of two interconnected proof masses for measuring acceleration in these directions.

BACKGROUND

In general, MEMS accelerometers typically include a proof mass that is suspended from a fixed structure by flexible elements so that the proof mass is partly mobile. When the accelerometer undergoes acceleration, the proof mass moves in relation to the fixed structure. By measuring the resulting displacement of the proof mass, the magnitude of the acceleration can be determined.

Some MEMS accelerometers are designed to measure acceleration only in the direction of one measurement axis. The proof mass can then be suspended from the fixed structure by flexible elements that allow relative movement along the measurement axis, but resists relative movement in directions that are perpendicular to the measurement axis. This arrangement often minimizes measurement errors.

Many applications exist where acceleration needs to be measured along three perpendicular measurement axes (i.e., the x, y, z axes). One way to achieve this is to build an accelerometer with three separate proof masses, one for each measurement axis. Each proof mass can then be suspended with flexible elements, which, as far as possible, allow relative movement only in the direction of the measurement axis to which this particular proof mass is dedicated.

However, systems with multiple proof masses with separate suspensions consume a lot of surface area and are therefore expensive. A cheaper solution is to utilize only one proof mass suspended with elements that allow relative movement in all three directions. For example, U.S. Pat. No. 9,246,017 discloses an accelerometer with one proof mass utilized for acceleration measurements along three perpendicular axes.

But when a single proof mass is allowed to move in three directions, the flexibility of the suspension makes the measurement sensitive to vibrations which should preferably be excluded from the measurement. This problem can be alleviated by using two masses instead of one. For example, U.S. Patent Publication No. 2018/0275161 discloses a three-axis accelerometer where a proof mass is divided into two sections coupled to each other. This system is more robust than a typical one-mass system, but it is still not optimal.

SUMMARY OF THE INVENTION

Accordingly, it is an object of the present disclosure to provide a two-mass, three-axis accelerometer that is not sensitive to external vibrations.

In one exemplary aspect, an accelerometer is provided for measuring acceleration in at least of two directions of an x-axis, a y-axis and a z-axis. In this aspect, the accelerometer includes a first proof mass that is suspended from one or more first anchor points by a first suspension structure that configures the first proof mass to undergo linear translation along the x-axis, rotation about a first vertical axis in an xy-plane and rotation about a first horizontal axis out of the xy-plane, with the first vertical axis being perpendicular to the xy-plane and the first horizontal axis being parallel to the y-axis; a second proof mass that is suspended from one or more second anchor points by a second suspension structure that configures the second proof mass to undergo linear translation along the x-axis, rotation about a second vertical axis in the xy-plane and rotation about a second horizontal axis out of the xy-plane, with the second vertical axis being perpendicular to the xy-plane and the second horizontal axis being parallel to the y-axis; and a coupling structure that couples the first proof mass to the second proof mass.

Moreover, according to the exemplary aspect, the first and second proof masses are positioned adjacent to each other and at least partly aligned with each other on the x-axis and lie in the xy-plane in respective rest positions, and the first proof of mass has a center of mass with an x-coordinate that is offset from the first horizontal axis and the second proof mass has a center of mass with an x-coordinate that is offset from the second horizontal axis.

According to the exemplary aspect, the coupling structure synchronizes movement of the first and second proof masses so that the first and second proof masses are linearly displaced from the respective rest positions in a same direction parallel to the x-axis when the accelerometer undergoes acceleration in the direction of the x-axis, the first proof mass is rotationally displaced from its respective rest position in the xy-plane about the first vertical rotation axis in a first rotational direction when the accelerometer undergoes acceleration in the direction of the y-axis, and the second proof mass is rotationally displaced from its respective rest position in the xy-plane about the second vertical rotation axis in a second rotational direction when the accelerometer undergoes acceleration in the direction of the y-axis, with the first rotational direction being opposite to the second rotational direction, and the first proof mass is rotationally displaced from its respective rest position out of the xy-plane about the first horizontal axis in a first rotational direction when the accelerometer undergoes acceleration in the direction of the z-axis, and the second proof mass is rotationally displaced from its respective rest position out of the xy-plane about the second horizontal axis in a second rotational direction when the accelerometer undergoes acceleration in the direction of the z-axis, with the first rotational direction being opposite to the second rotational direction.

The exemplary aspects of the present disclosure are based on the idea of using suspension and coupling structures that allow the two proof masses to rotate in opposite directions both in response to acceleration in a first direction and in response to acceleration in a second direction which is perpendicular to the first. An advantage of this arrangement is that the effect of external rotational vibrations on these two acceleration measurements can be effectively cancelled with a differential measurement.

BRIEF DESCRIPTION OF THE DRAWINGS

In the following, the disclosure will be described in greater detail by exemplary embodiments with reference to the accompanying drawings, in which.

DETAILED DESCRIPTION

Figure 1A:
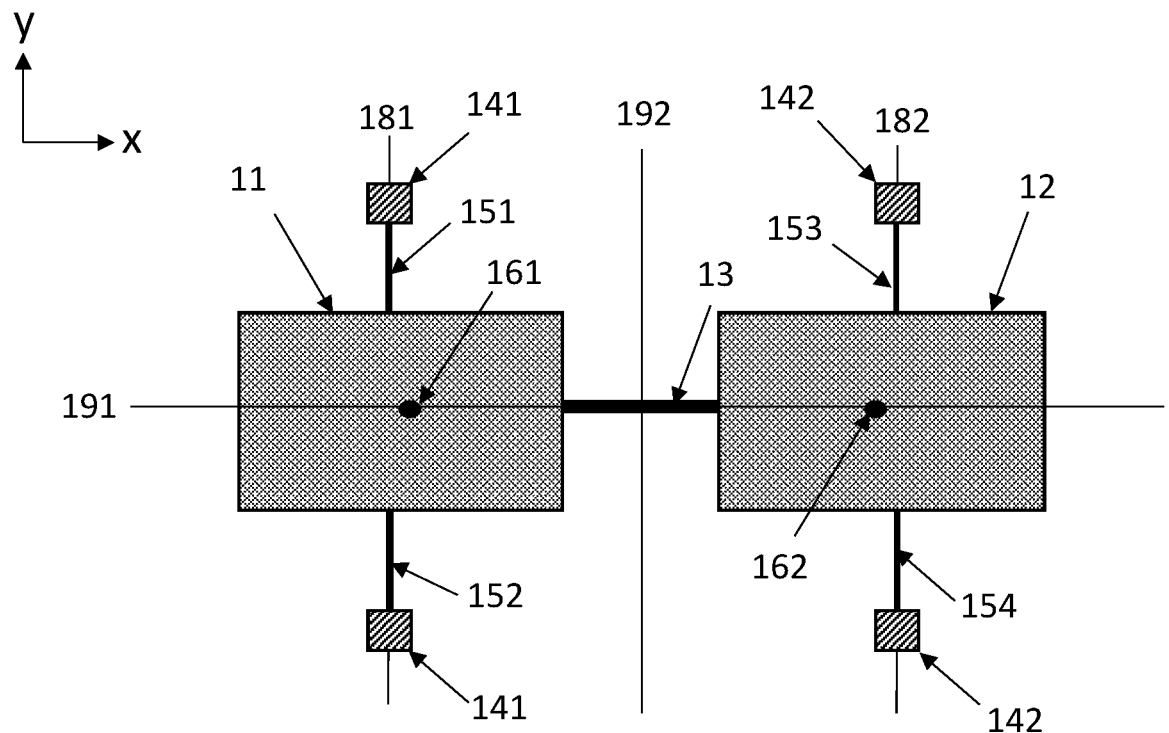
FIGS. 1a and 1e illustrate an accelerometer with a first proof mass and a second proof mass according to an exemplary aspect.

According to the exemplary aspects, an accelerometer is provided for measuring acceleration in the direction of at least two of the following axes: an x-axis, a y-axis and a z-axis. The x, y and z-axes are perpendicular to each other and the accelerometer comprises a first proof mass and a second proof mass. In this aspect, the first and second proof masses are adjacent to each other and at least partly aligned with each other on the x-axis. The first and second proof masses are coupled to each other with a coupling structure that extends from the first proof mass to the second proof mass. The first and second proof masses lie in the xy-plane in their rest position.

The first proof mass is suspended from one or more first anchor points by a first suspension structure that allows the first proof mass to undergo linear translation along the x-axis, rotation about a first vertical axis in the xy-plane and rotation about a first horizontal axis out of the xy-plane. The first vertical axis is perpendicular to the xy-plane and the first horizontal axis is parallel to the y-axis. The second proof mass is suspended from one or more second anchor points by a second suspension structure that allows the second proof mass to undergo linear translation along the x-axis, rotation about a second vertical axis in the xy-plane and rotation about a second horizontal axis out of the xy-plane. The second vertical axis is perpendicular to the xy-plane and the second horizontal axis is parallel to the y-axis.

There are two exemplary aspects that can be implemented in all exemplary embodiments described herein. Either the x-coordinate of the center of mass of the first proof mass is greater than the x-coordinate of the first horizontal axis and the x-coordinate of the center of mass of the second proof mass is less than the x-coordinate of the second horizontal axis, or the x-coordinate of the center of mass of the first proof mass if less than the x-coordinate of the first horizontal axis and the x-coordinate of the center of mass of the second proof mass is greater than the x-coordinate of the second horizontal axis.

Moreover, the coupling structure synchronizes the movement of the first and second proof masses so that the first and second proof masses are linearly displaced from their rest position in the same direction parallel to the x-axis when the accelerometer undergoes acceleration in the direction of the x-axis.

The coupling structure also synchronizes the movement of the first and second proof masses so that the first proof mass is rotationally displaced from its rest position in the xy-plane about the first vertical rotation axis in a first rotational direction when the accelerometer undergoes acceleration in the direction of the y-axis, and the second proof mass is rotationally displaced from its rest position in the xy-plane about the second vertical rotation axis in a second rotational direction when the accelerometer undergoes acceleration in the direction of the y-axis. The first rotational direction is opposite to the second rotational direction.

The coupling structure also synchronizes the movement of the first and second proof masses so that the first proof mass is rotationally displaced from its rest position out of the xy-plane about the first horizontal axis in a first rotational direction when the accelerometer undergoes acceleration in the direction of the z-axis, and the second proof mass is rotationally displaced from its rest position out of the xy-plane about the second horizontal axis in a second rotational direction when the accelerometer undergoes acceleration in the direction of the z-axis, wherein the first rotational direction is opposite to the second rotational direction.

In an exemplary aspect, the first suspension structure comprises a first bendable torsion element and a second bendable torsion element which extend in opposite y-directions from the one or more first anchor points to the first proof mass. The second suspension structure comprises a third bendable torsion element and a fourth bendable torsion element which extend in opposite y-directions from the one or more second anchor points to the second proof mass.

The first and second rotational directions about the first and second vertical rotation axes may alternatively be called the first and second in-plane rotational directions, respectively. The first and second rotational directions about the first and second horizontal axes may alternatively be called the first and second out-of-plane rotational directions, respectively.

In this disclosure the xy-plane is also called the device plane. The device plane may also be called the horizontal plane. The z-axis is perpendicular to the xy-plane, and it may also be called the vertical axis. The x, y and z-axes and terms such as "horizontal" and "vertical", "up" and "down", "above" and "below", refer here only to a plane and to a direction which is vertical to that plane. It should be appreciated that they do not imply anything about how the device should be oriented with respect to earth's gravitational field during manufacturing or use.

The proof masses are in their rest position when the accelerometer does not undergo accelerating movement. Linear and/or rotational motion where a proof mass remains level in the device plane when it moves away from its rest position may be referred to as "in-plane" motion or "motion in the device plane". Rotation about any axis perpendicular to the device plane may be referred to as rotation about the z-axis. Rotational motion where a proof mass rotates away from the device plane when it moves away from its rest position may be referred to as "out-of-plane" motion or "motion out of the device plane".

The accelerometer may be an accelerometer for measuring acceleration in the direction of the x-axis, the y-axis and the z-axis.

Alternatively, the accelerometer may be an accelerometer for measuring acceleration in the direction of the x-axis and the y-axis. In this case, the suspension structure can be allowed to be stiff against out-of-plane rotation, so that the rotational displacement in the first and second proof masses in response to z-axis acceleration is small. It does not have to be measured. Similarly, the coupling structure may in this case synchronize the out-of-plane rotation of the first and second proof masses only weakly since this displacement is not measured.

In an accelerometer for measuring acceleration in the direction of the x-axis and the y-axis, the first suspension structure may allow the first proof mass to undergo linear translation along the x-axis and rotation about the first vertical axis in the xy-plane. The second suspension structure may allow the second proof mass to undergo linear translation along the x-axis and rotation about the second vertical axis in the xy-plane. Furthermore, the coupling structure may synchronize the movement of the first and second proof masses so that the first and second proof masses are linearly displaced from their rest position in the same direction parallel to the x-axis when the accelerometer undergoes acceleration in the direction of the x-axis, and so that the first proof mass is rotationally displaced from its rest position in the xy-plane about the first vertical rotation axis in a first rotational direction when the accelerometer undergoes acceleration in the direction of the y-axis, and the second proof mass is rotationally displaced from its rest position in the xy-plane about the second vertical rotation axis in a second rotational direction when the accelerometer undergoes acceleration in the direction of the y-axis. The first rotational direction is opposite to the second rotational direction.

Alternatively, the accelerometer may be an accelerometer for measuring acceleration in the direction of the x-axis and the z-axis. In this case, the suspension structure can be allowed to be stiff against in-plane rotation, so that the rotational displacement in the first and second proof masses in response to y-axis acceleration is small. It does not have to be measured. Similarly, the coupling structure may in this case synchronize the in-plane rotation of the first and second proof masses only weakly since this displacement is not measured.

In an accelerometer for measuring acceleration in the direction of the x-axis and the z-axis, the first suspension structure can allow the first proof mass to undergo linear translation along the x-axis and rotation about the first horizontal axis out of the xy-plane. Moreover, the second suspension structure can allow the second proof mass to undergo linear translation along the x-axis and rotation about the second horizontal axis out of the xy-plane. Furthermore, the coupling structure synchronizes the movement of the first and second proof masses so that the first and second proof masses are linearly displaced from their rest position in the same direction parallel to the x-axis when the accelerometer undergoes acceleration in the direction of the x-axis, and so that the first proof mass is rotationally displaced from its rest position out of the xy-plane about the first horizontal axis in a first rotational direction when the accelerometer undergoes acceleration in the direction of the z-axis, and the second proof mass is rotationally displaced from its rest position out of the xy-plane about the second horizontal axis in a second rotational direction when the accelerometer undergoes acceleration in the direction of the z-axis, wherein the first rotational direction is opposite to the second rotational direction.

Alternatively, the accelerometer can be an accelerometer for measuring acceleration in the direction of the y-axis and the z-axis. In this case, the suspension structure can be allowed to be stiff against translation along the x-axis, so that the linear displacement in the first and second proof masses in response to x-axis acceleration is small. It does not have to be measured. Similarly, the coupling structure may in this case synchronize the linear movement of the first and second proof masses only weakly since this displacement is not measured.

In an accelerometer for measuring acceleration in the direction of the y-axis and the z-axis, the first suspension structure may allow the first proof mass to undergo rotation about the first vertical axis in the xy-plane and rotation about the first horizontal axis out of the xy-plane. The second suspension structure may allow the second proof mass to undergo rotation about a second vertical axis in the xy-plane and rotation about a second horizontal axis out of the xy-plane. The coupling structure may synchronize the movement of the first and second proof masses so that the first proof mass is rotationally displaced from its rest position in the xy-plane about the first vertical rotation axis in a first rotational direction when the accelerometer undergoes acceleration in the direction of the y-axis, and the second proof mass is rotationally displaced from its rest position in the xy-plane about the second vertical rotation axis in a second rotational direction when the accelerometer undergoes acceleration in the direction of the y-axis. The coupling structure may also synchronizes the movement of the first and second proof masses so that the first proof mass is rotationally displaced from its rest position out of the xy-plane about the first horizontal axis in a first rotational direction when the accelerometer undergoes acceleration in the direction of the z-axis, and the second proof mass is rotationally displaced from its rest position out of the xy-plane about the second horizontal axis in a second rotational direction when the accelerometer undergoes acceleration in the direction of the z-axis, wherein the first rotational direction is opposite to the second rotational direction.

In general, when measurement along one axis is omitted, the suspension and coupling structures can be optimized so that the response of the accelerometer to acceleration along the two axes that are being measured is better (e.g., less sensitive to vibrations) than the measurement response that can be obtained for the same axes with a device where all three axes are measured.

In this disclosure, the expression "aligned on the x-axis" refers to the placement of proof masses so that the x-axis crosses said proof mass. The first and second proof masses may have substantially the same size and geometry. The first and second proof masses may be symmetric in relation to the x-axis. The x-axis may cross the center of gravity of the first and second proof masses. However, equal size and full symmetry are not absolutely necessary—the same suspension and coupling arrangements can be utilized even if the proof masses are not perfectly aligned with each other.

In this disclosure, the term "suspension structure" refers to a structure that is placed between a fixed part (e.g., an anchor point) and a mobile device part (e.g., a proof mass). A suspension structure comprises at least some flexible parts, which may be called suspension springs. The suspension structure may also comprise stiff parts. The flexibility of suspension springs allows the suspended proof masses to move in response to acceleration.

The term "coupling structure" refers to a part or combination of parts that connects one suspended proof mass to another. A coupling structure influences the movement of the proof masses to which it is coupled and also the resonance frequency at which the proof masses oscillate together. Coupling structures comprise at least some flexible parts, which may be called coupling springs. These springs typically bend or twist when the suspended proof masses are in motion. Coupling structure may in some cases also comprise stiff parts.

The suspension structure may sometimes be used also as coupling structures, and vice versa. However, the suspension structures and coupling structures may be separate structures, as FIG. 1a for example illustrates. The coupling structure may be a structure which is only connected between the first and second proof mass and not directly connected to any anchor point.

A coupling structure may also be called a synchronization structure. The term "synchronize", and phrases such as "structure A synchronizes oscillation mode X", have the following meaning. Structure A is a mechanical connection in a system of interconnected mass elements that should preferably move in a desired mode X (e.g., anti-phase movement), but preferably not in an undesired mode Y (e.g., in-phase movement, where both masses move in the same direction). Structure A exhibits a beneficial combination of rigidity and flexibility, so that the presence of structure A improves the relationship between the resonance frequency $F_X$ of mode X and the resonance frequency $F_Y$ of mode Y in the system.

The presence of structure A may, for example, increase the ratio $F_Y/F_X$ and/or the difference $F_Y-F_X$. The reference state against which this improvement is measured may in some cases be the same system of mass elements without structure A. Structure A is in this case needed only for synchronization. In other cases, when structure A is also needed for supporting the weight of the mass elements, the reference state against which the synchronization improvement is measured may be the same system of mass elements where A has been replaced with an alternative structure B which only gives structural support. Alternatively, the reference may be the resonance frequency which is obtained with a single mass (with substantially the same size and geometry as the first and second proof masses) which undergoes the same movement.

In general, suspension and coupling structures should be optimized for mechanical support, flexibility for movement in some directions and rigidity for movement in other directions. In applications where the proof masses are given multiple degrees of freedom, these three variables will to some extent conflict with each other. Optimization means finding a solution where each requirement is satisfied to a sufficient degree. All elements of the accelerometer may influence the optimization process.

FIG. 1a illustrates an accelerometer where a first proof mass 11 and a second proof mass 12 are aligned on an x-axis 191 according to an exemplary aspect. As shown, the proof masses are coupled to each other with a coupling structure 13 that lies between the proof masses. A y-axis 192 crosses the x-axis 191 halfway between the first and second proof masses 11 and 12, so that the coupling structure 13 is aligned both on the x-axis 191 and on the y-axis 192. The first suspension structure has been illustrated as bars 151 which extend from the first proof mass 11 to first anchor points 141. The second suspension structure has been illustrated as bars 152 which extend from the second proof mass 12 to second anchor points 142. The two first anchor points 141 are here located on opposite sides of the first proof mass 11 (i.e., in the y-axis direction), and the two second anchor points 142 are located on opposite sides of the second proof mass 12 (i.e., in the y-axis direction).

The first horizontal axis 181 here extends between the first anchor points 141 and the second horizontal axis 182 extends between the second anchor points 142. The bars 151-154 form bendable torsion elements that may be called torsion bars. In FIG. 1a the first suspension structure comprises a first bendable torsion element 151 and a second bendable torsion element 152 which extend in opposite y-directions from the one or more first anchor points 141 to the first proof mass 11. The second suspension structure comprises a third bendable torsion element 153 and a fourth bendable torsion element 154 which extend in opposite y-directions from the one or more second anchor points 142 to the second proof mass 12.

The bendable torsion elements described in this disclosure twist flexibly around an axis that is aligned with the corresponding rotation axis. The anchor points 141-142 may both lie on the corresponding horizontal axes 181-182, as FIG. 1a illustrates. Alternatively, the bendable torsion elements in the suspension structure may lie on the horizontal axes, but the first and second anchor points 141-142 may not. The positions of the horizontal axes in relation to the anchor points therefore depend on the details of the suspension structure.

FIG. 1a illustrates a device where the center of mass 161 of the first proof mass 11 has a larger x-coordinate (e.g., offset to the right) than the first horizontal axis 181, and where the center of mass 162 of the second proof mass 12 has a smaller x-coordinate (e.g., offset to the left) than the second horizontal axis 182.

Figure 1B:
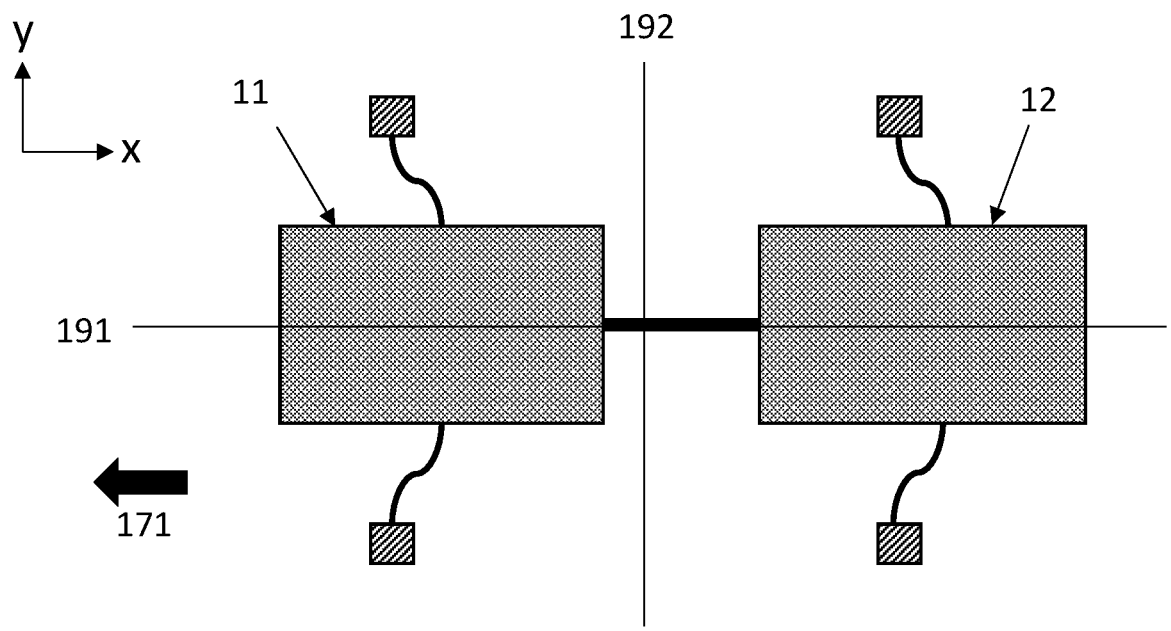
FIGS. 1b-1d and 1f illustrate the movement of the proof masses according to an exemplary aspect.

The proof masses, the suspension structures and the coupling structure are illustrated in their rest positions in FIG. 1a. FIG. 1b illustrates schematically the movement of the proof masses when the accelerometer undergoes acceleration in the negative x-direction 171, illustrated with a thick black arrow. The first and second proof masses 11-12 here move in linear translation in the same direction.

Figure 1C:
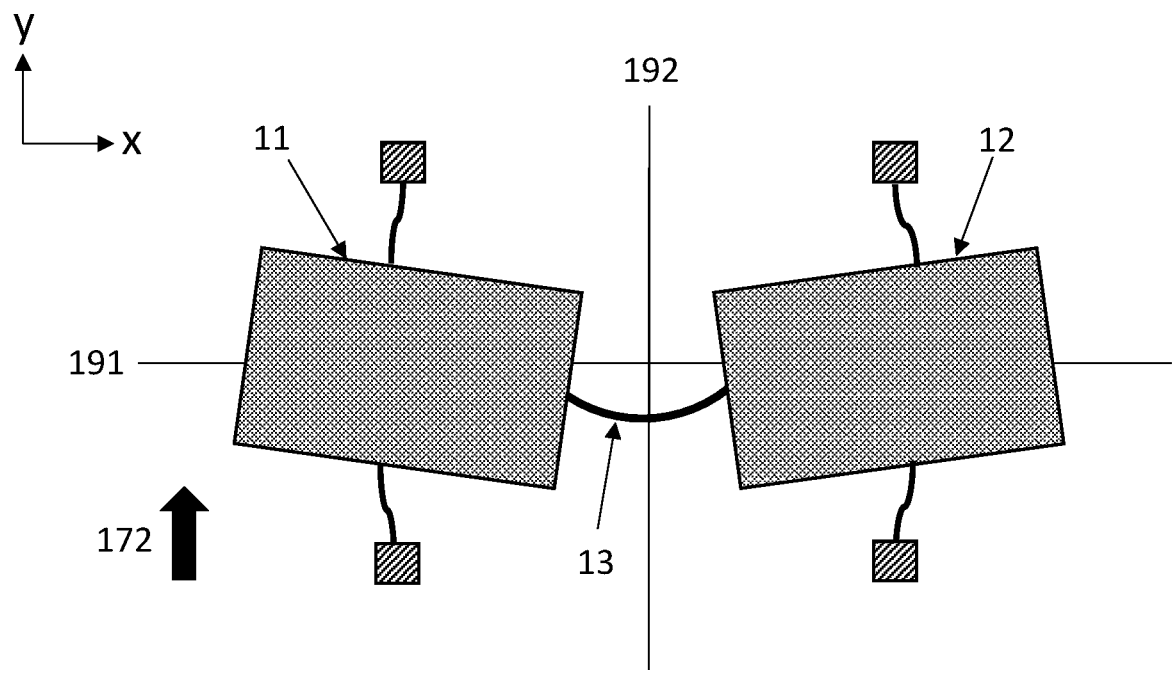

FIG. 1c illustrates schematically the movement of the proof masses when the accelerometer undergoes acceleration in the positive y-direction 172. Because the center of mass of each proof mass 11/12 does not lie on the corresponding rotation axis 181/182, each proof mass will impart a torque on the corresponding suspension structure. If the suspension structures are sufficiently flexible, the proof masses will rotate in the device plane as FIG. 1c illustrates. This rotation will be anti-phase rotation due to the way that the centers of mass 161 and 162 are placed in relation to the horizontal axes 181 and 182, respectively. In other words, the first and second proof mass rotate in opposite directions in the xy-plane.

Figure 1D:
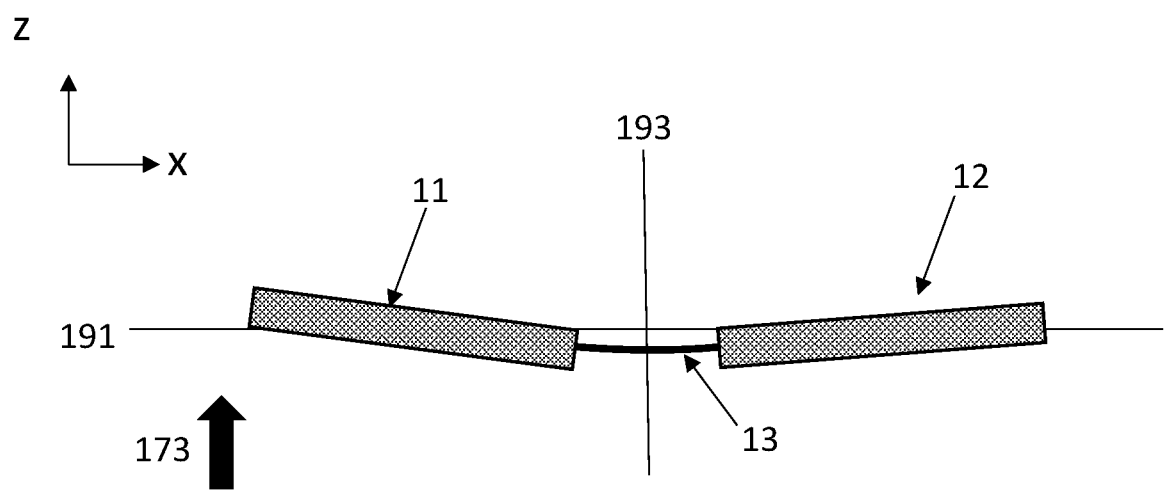

FIG. 1d illustrates schematically the movement of the proof masses when the accelerometer undergoes acceleration in the positive z-direction 173. The positions of the centers of mass 161 and 162 in relation to the horizontal axes 181 and 182, respectively, produces anti-phase out-of-plane rotation. In other words, the first and second proof masses rotate in opposite directions.

Figure 1E:
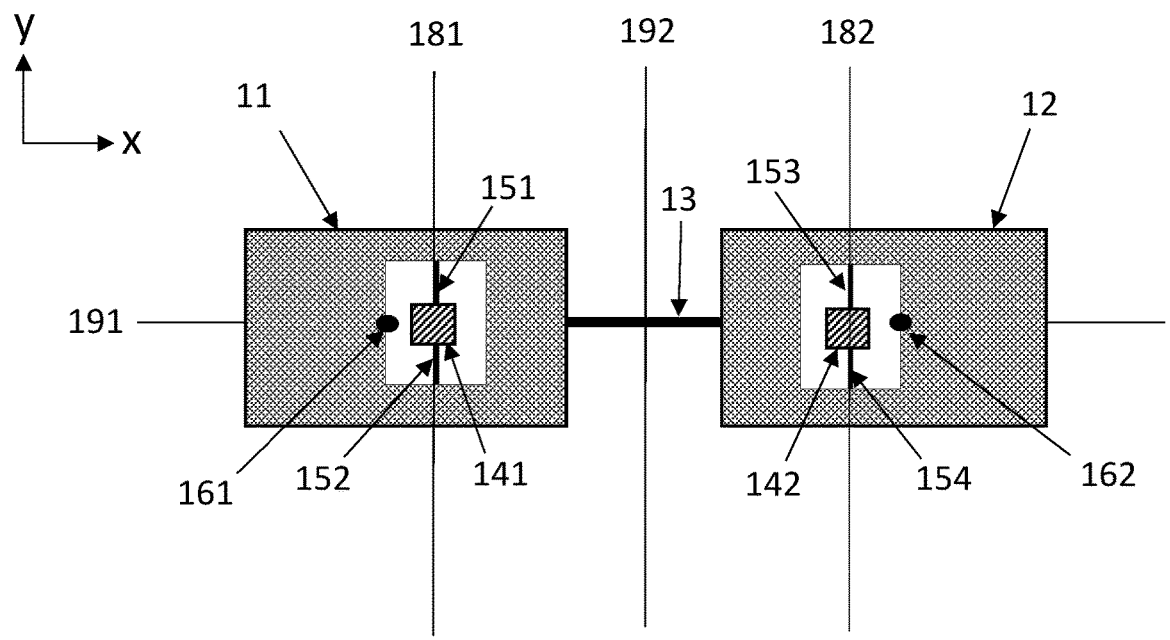

FIG. 1e illustrates a different suspension structure where the bars 151 that form bendable torsion elements in the first suspension structure are attached to the same first anchor point 141, and this first anchor point 141 lies within an opening in the first proof mass 11. The same arrangement is used in the second suspension structure. There could alternatively be two separate first/second anchor points within the opening in each proof mass.

FIG. 1e also illustrates a device where the center of mass 161 of the first proof mass 11 lies to the left of the first horizontal axis 181, and the center of mass 162 of the second proof mass 12 lies to the right of the second horizontal axis 182. The placement of the center of mass is not linked to the details of the suspension structure—the center of mass geometry illustrated in FIG. 1a could also be implemented in FIG. 1e, and vice versa.

The one or more first anchor points and the one or more second anchor points may lie substantially on the x-axis, as FIG. 1e illustrates. In an exemplary aspect, the first suspension structure can comprise a first bendable torsion element 151 and a second bendable torsion element 152 that extend in opposite y-directions from the one or more first anchor points 141 to the first proof mass 11. The second suspension structure may comprise a third bendable torsion element 153 and a fourth bendable torsion element 154 that extend in opposite y-directions from the one or more second anchor points 142 to the second proof mass 12.

When the centers of mass are arranged in the manner which FIG. 1e illustrates, each proof mass will, in response to the y- and z-accelerations 172 and 173 illustrated in FIGS. 1c and 1d, rotate in directions which are opposite to the rotation directions illustrated in FIGS. 1c and 1d. The first and the second proof mass will still rotate in anti-phase. The rotation of the proof masses shown in FIG. 1e in response to y-axis acceleration 172 has been illustrated in FIG. 1f. FIGS. 1a and 1e illustrate proof masses that are asymmetric in the xy-plane with respect to the corresponding horizontal axes 181 and 182. However, the proof masses could alternatively be symmetric in the xy-plane with respect to the horizontal axes, and one or more regions on each proof mass could be made thinner in the z-direction than the rest of the proof mass. If these one or more regions are asymmetric with respect to the rotation axis, the center of mass of the proof mass will be shifted away from the rotation axis.

In other words, the first proof mass may be asymmetric in the xy-plane with respect to the first horizontal axis, and the second proof mass may be asymmetric in the xy-plane with respect to the second horizontal axis. Alternatively or complementarily, in any embodiment in this disclosure where a proof mass is illustrated as being either symmetric or asymmetric with respect to the rotation axis in the xy-plane, the first proof mass may comprise a first thinned region which is asymmetric with respect to the first horizontal axis, and the second proof mass may comprise a second thinned region which is asymmetric with respect to the second horizontal axis.

Moreover, a thinned region can be implemented even in a proof mass that is asymmetric with respect to the rotation axis. In other words, the proof mass can be either asymmetric or symmetric with respect to the rotation axis in the xy-plane and comprise one or more regions which are thinner in the z-direction than the rest of the proof mass. If the proof mass is symmetric, these regions must be placed asymmetrically with respect to the rotation axis.

The anti-phase rotation of the first and second proof masses facilitates a differential measurement where, for example, a y-axis or z-axis output signal measured from the first proof mass can be added to a corresponding output signal measured from the second proof mass. The effect of some external interference, for example, rotational vibrations on this summed output signal will then be automatically cancelled because the increase produced by the external vibration in the signal measured from the first proof mass will be closely countered by a corresponding decrease in the signal measured from the second proof mass.

Suspension Structures

According to various exemplary aspects, any of the following suspension structures may be used if the accelerometer is an accelerometer for measuring acceleration in the direction of the x-axis, the y-axis and the z-axis. Any of them may also be used if the accelerometer is an accelerometer for measuring acceleration in the direction of the x-axis and the y-axis. Any of them may also be used if the accelerometer is an accelerometer for measuring acceleration in the direction of the x-axis and the z-axis. Any of them may also be used if the accelerometer is an accelerometer for measuring acceleration in the direction of the y-axis and the z-axis.

Figure 2A:
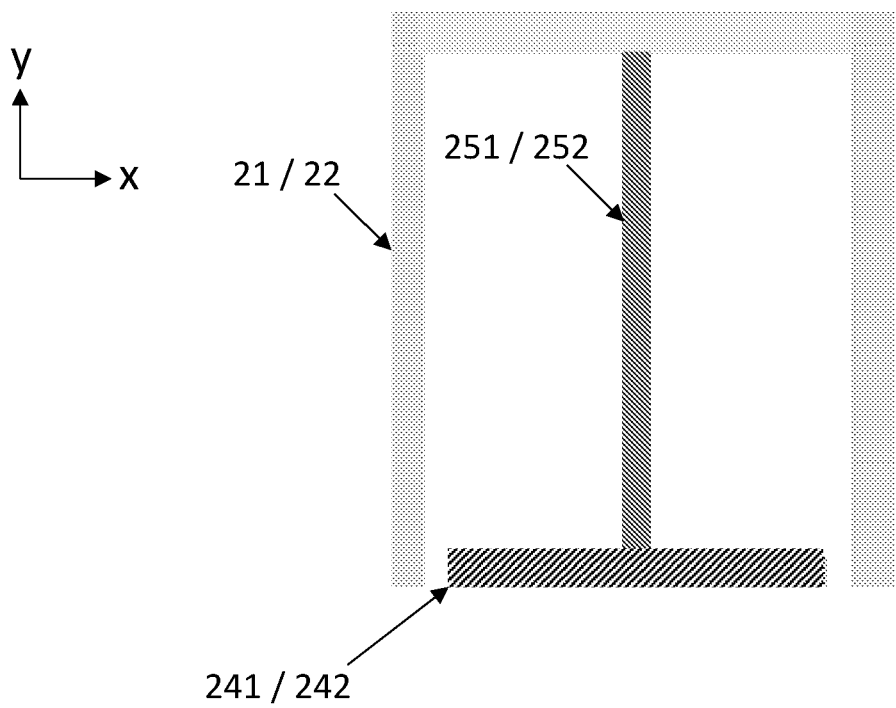
FIGS. 2a and 2b illustrate suspension structures according to exemplary aspects.
Figure 2B:
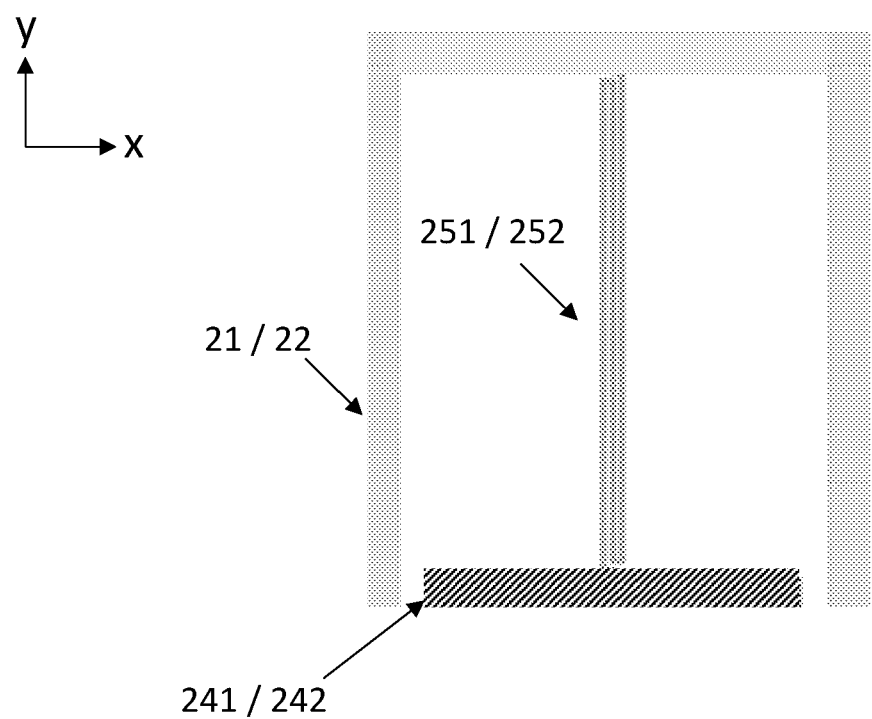

FIGS. 2a and 2b illustrate first and second suspension structures. Reference numbers 21-22, 241-242 and 251-252 correspond to reference numbers 11-12, 141-142 and 151-152, respectively, in FIG. 1e where the proof masses surround their respective anchor points. The same suspenders can be used also in the embodiments shown in FIG. 1a, where the anchor points are outside of the proof masses.

Figure 1F:
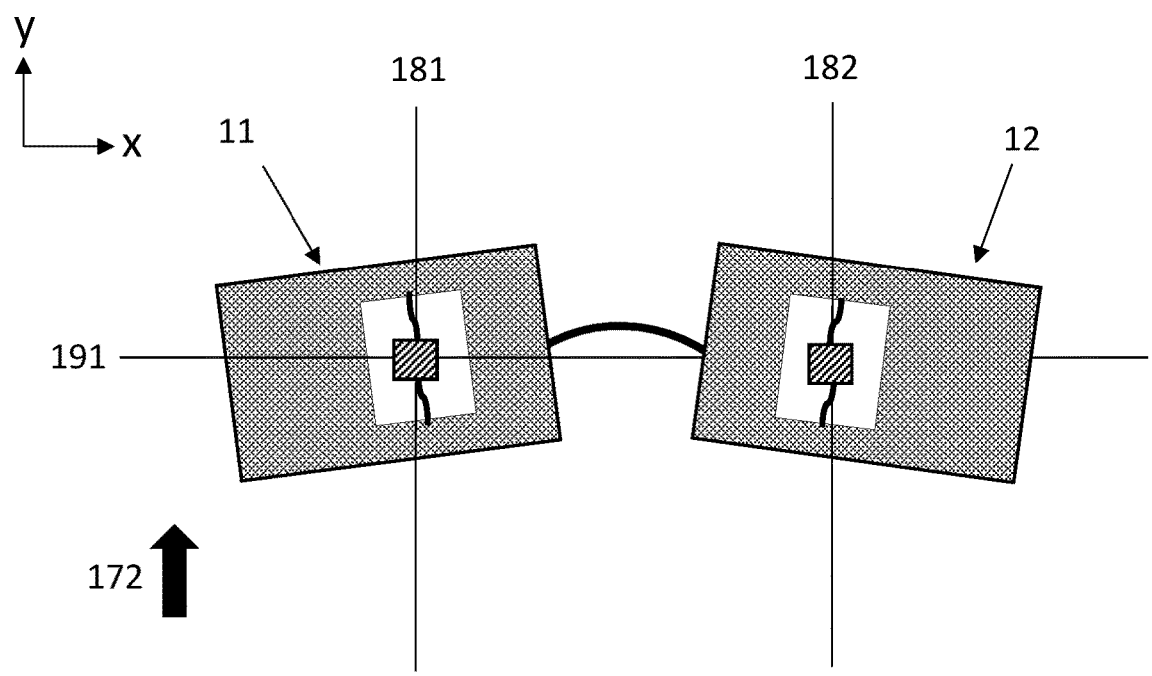

The first, second, third and fourth bendable torsion elements may, for example, be straight torsion bars. In FIG. 2a the first/second suspension structure comprises straight torsion bars 251/252 that extend in the y-direction from the corresponding anchor point (or, alternatively, from a stiff part of a more complicated suspension structure) to the proof mass. These torsion bars 251/252 are narrow enough in the x-direction to allow the proof masses 21/22 to rotate in anti-phase out of the device plane in z-axis acceleration, as FIG. 1d illustrates. In x-axis acceleration and y-axis acceleration the torsion bars bend into an elongated S-shape, as FIGS. 1b, 1c and 1f illustrate.

In another exemplary aspect, the first, second, third and fourth bendable torsion elements may alternatively be folded beams, and each folded beam may comprise a plurality of y-subbeams that extend in the y-direction and a plurality of corresponding x-subbeams that extend in the x-direction between the y-subbeams. FIG. 2b illustrates an alternative suspension structure which comprises a meandering folded beam 251/252 as the bendable torsion element. This design provides more flexibility particularly in x-axis and y-axis acceleration than the arrangement illustrated in FIG. 2a. The compression/expansion of the meandering folded beam in the x-direction can also to some extent reduce the extent to which the suspender must bend into the shape of an S letter, thereby balancing the stiffness ratio between the linear x-mode and the naturally looser rotational y and z spring modes.

Alternatively, the one or more first anchor points may alternatively comprise two first anchor points on opposite sides of the x-axis, and the one or more second anchor points may comprise two second anchor points on opposite sides of the x-axis, as FIG. 1a illustrates. The bendable torsion elements described above can also be implemented in this configuration by placing them between the one or more first/second anchor points and the corresponding proof mass.

In general, the first and second suspension structures allow out-of-plane rotation by being torsionally flexible, and they allow in-plane rotation and translation along the x-axis by bending flexible in the xy-plane when the proof mass 21/22 moves in x-acceleration or y-acceleration.

Coupling Structures

According to various exemplary aspects, any of the following coupling structures may be used if the accelerometer is an accelerometer for measuring acceleration in the direction of the x-axis, the y-axis and the z-axis. Any of them may also be used if the accelerometer is an accelerometer for measuring acceleration in the direction of the x-axis and the y-axis. Any of them may also be used if the accelerometer is an accelerometer for measuring acceleration in the direction of the x-axis and the z-axis. Any of them may also be used if the accelerometer is an accelerometer for measuring acceleration in the direction of the y-axis and the z-axis.

FIGS. 3a-3f illustrate various options for the coupling structure. Reference numbers 31-33 and 391 correspond to reference numbers 11-13 and 191, respectively, in FIGS. 1a-1e.

It can be seen in FIGS. 1b-1d that the coupling structure should meet several criteria, some of which may partly be in conflict with each other. The coupling structure can therefore be optimized in many different ways. The optimal solution will depend on the sizes of the proof masses, on the flexibility of the suspension structures and/or on the sensitivity (displacement per acceleration unit) that is desired in each of the x-y, and z-acceleration measurements. Preferably the coupling should be as stiff as possible in the x-axis direction, but sufficiently loose or flexible for y-axis and z-axis anti-phase rotations, however still rejecting their common-modes.

Figure 3A:
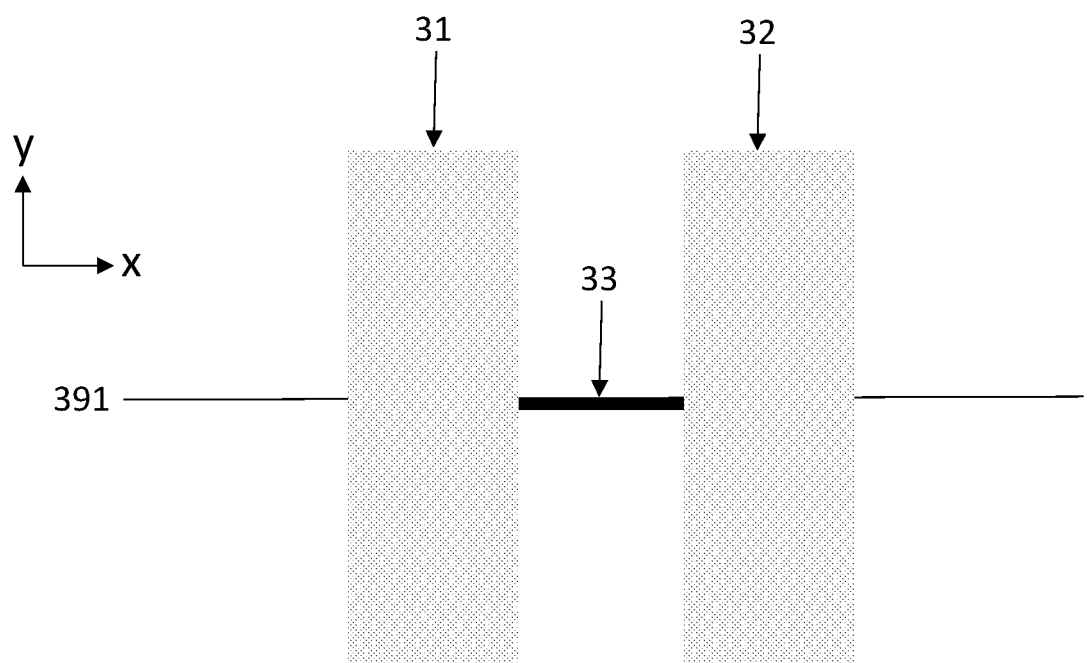
FIGS. 3a to 3f illustrate coupling structures according to various exemplary aspects.

The coupling structure may include a single spring that is aligned substantially on the x-axis. FIG. 3a illustrates a coupling structure 33 that is an elongated beam spring. This corresponds to the coupling structure that was illustrated in action in FIGS. 1b-1d. An elongated beam spring which is oriented in the x-direction is also stiff in the x-direction, so it couples the x-acceleration movement of the two masses very strongly. In the y- and z-acceleration movement illustrated in FIGS. 1c-1d, the spring needs to bend in the device plane and out of the device plane, respectively. The out-of-plane bending needed for accommodating anti-phase rotation in response to z-acceleration may require the coupling spring to be thinner in the z-direction than the proof masses 31 and 32 are. This difference in vertical thickness has been illustrated for the coupling structure 13 in FIG. 1d. The coupling spring could alternatively have the same vertical thickness as the proof masses but be sufficiently long in the x-direction to facilitate out-of-plane bending.

Figure 3B:
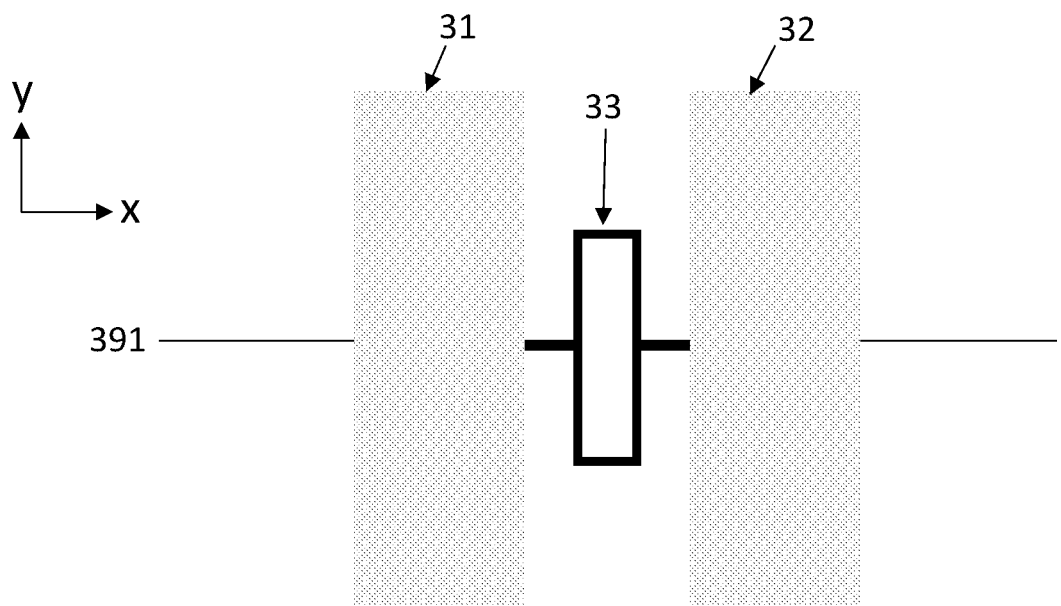

FIG. 3b illustrates a coupling structure 33 that includes one box spring. The box spring provides less stiffness in the x-direction than an elongated beam spring, but it accommodates anti-phase rotation in response to y-acceleration more easily than the elongated beam spring. The thickness of the box spring in the z-direction may however in some applications need to be made less than the thickness of the proof masses to accommodate anti-phase rotation in response to z-acceleration sufficiently flexibly.

Figure 3C:
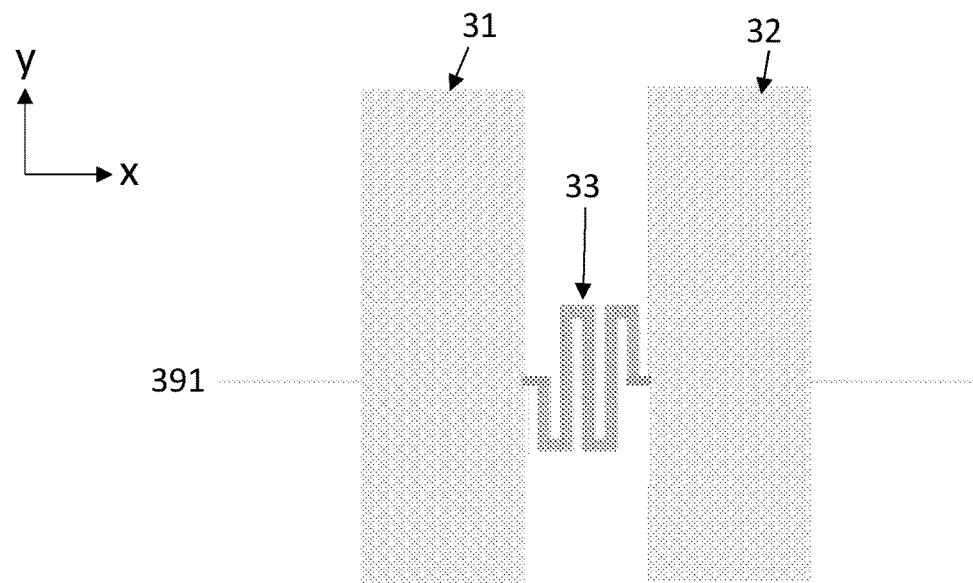

FIG. 3c illustrates a coupling structure 33 that includes one meandering spring. In other words, the single spring is here a folded beam spring comprising a plurality of x-subsections which extend in the x-direction and a plurality of corresponding y-subsections which extend in the y-direction between the x-subsections. The meandering spring also provides less stiffness in the x-direction that an elongated beam spring, but it can accommodate anti-phase rotation in response to both y- and z-acceleration significantly more flexibly than an elongated beam spring or a box spring. The stiffness trade-off between x and y and z modes can be adjusted by changing the lengths of the x- and y-subsections.

Figure 3D:
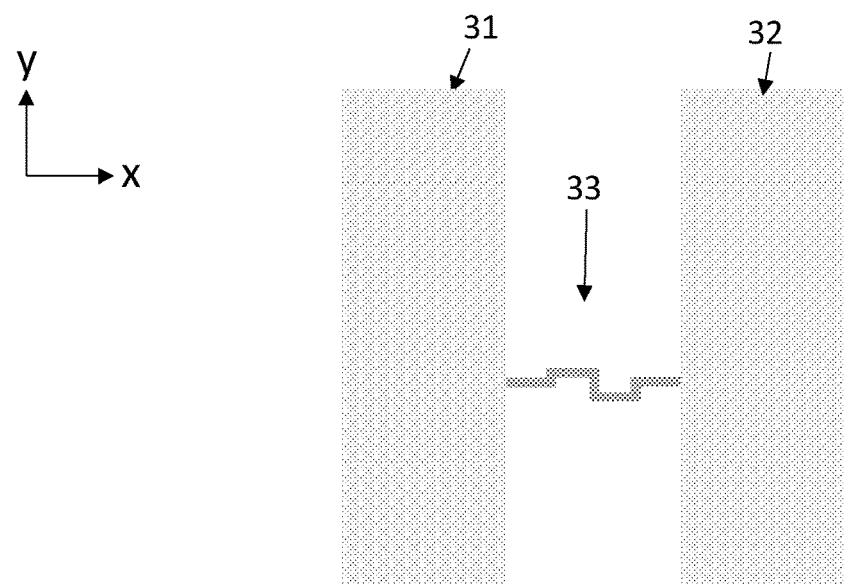

In FIG. 3c, the length of each y-subsection (in the y-direction) in the coupling structure is greater than the length of each x-subsection (in the x-direction). FIG. 3d illustrates an alternative coupling structure where the length of each x-subsection (in the x-direction) is greater than the length of each y-subsection (in the y-direction). Each x-subsection could alternatively have the same length (in the x-direction) as each y-subsection (in the y-direction).

The coupling structure may alternatively include a first spring and a second spring that lie on opposite sides of the x-axis at substantially the same distance from the x-axis. Both the first spring and the second spring may, for example, be elongated beam springs. Alternatively, both of them may be box springs, for example.

Figure 3E:
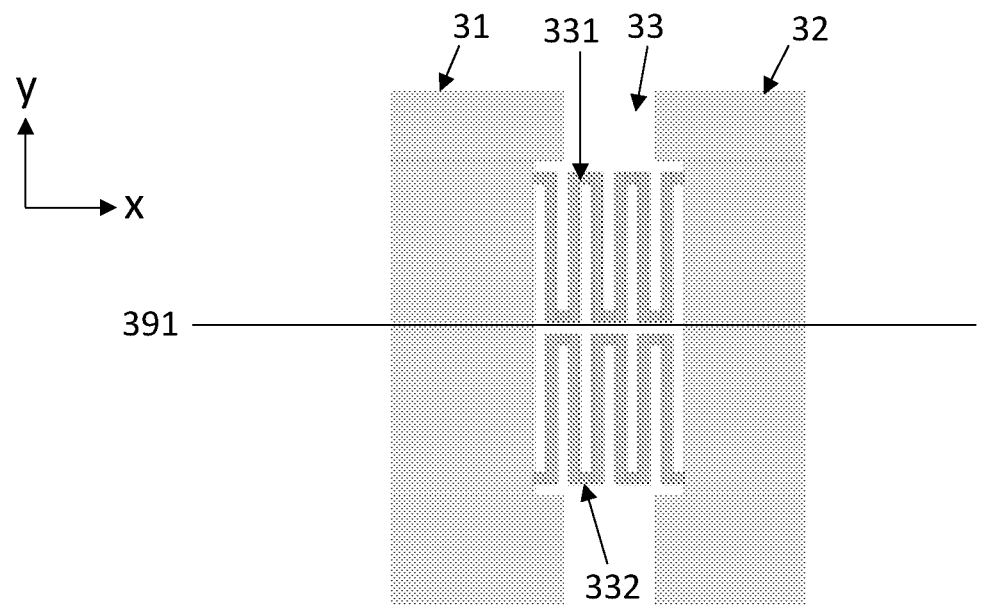

FIG. 3e illustrates an alternative option where the coupling structure 33 comprises a first meandering spring 331 and a second meandering spring 332. In other words, here both the first spring and the second spring are folded beam springs which comprise a plurality of x-subsections which extend in the x-direction and a plurality of corresponding y-subsections which extend in the y-direction between the x-subsections. The two meandering springs are adjacent to each other. The point where the first meandering spring 331 is attached to the first proof mass 31 may be aligned in the x-direction with the point where the first meandering spring 331 is attached to the second proof mass 32. Similarly, the point where the second meandering spring 332 is attached to the first proof mass 31 may be aligned in the x-direction with the point where the second meandering spring 332 is attached to the second proof mass 32.

Figure 3F:
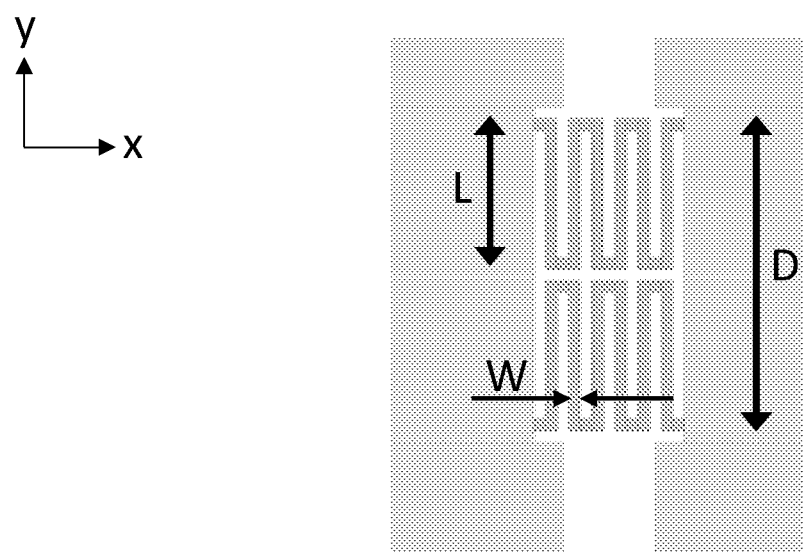

This coupling structure has the benefit that it allows the characteristic resonance frequency of the two-mass system in y-acceleration to be matched with its characteristic resonance frequency in x-acceleration, and it also allows its characteristic resonance frequency in z-acceleration to be matched with both x- and y-resonance frequencies. FIG. 3f illustrates this in more detail.

As shown, the distance L, which is the width in the y-direction of the first and second meander springs, is made short enough to couple the motion of the two proof masses in x-acceleration to a sufficient degree. The distance D, which is the distance in the y-direction between the attachment points of the two meander springs on the first and second proof masses, can be chosen so that the characteristic resonance frequency of y-acceleration is substantially equal to the characteristic resonance frequency of x-acceleration. The variable D has no impact on the x-acceleration or z-acceleration response.

The width W of the meander springs and the number of meander turns can be chosen so that the characteristic resonance frequency of z-acceleration is substantially equal to the characteristic resonance frequency of x-acceleration. The coupling structure may alternatively comprise more than two springs. These springs may be placed symmetrically with respect to the x-axis. Three springs may for example be placed so that one of them is aligned on the x-axis and two others are on opposite sides of the x-axis, at substantially the same distance from the x-axis. Coupling structures with four or more springs may also be implemented symmetrically with respect to the x-axis. Regardless of the number of springs, the springs may have any of the shapes presented above. In a coupling structure with multiple springs, the geometry of each spring does not necessarily have to be the same.

The coupling structure synchronizes the movement of the first and second proof masses so that the first and second proof masses may be linearly displaced from their rest position in the same x-direction, rotationally displaced in opposite directions in the device plane, and rotationally displaced in opposite directions out of the device plane.

According to the exemplary aspect, the coupling structure 33 synchronizes the movement of the first and second proof masses in x-acceleration by being sufficiently stiff in the x-direction to transfer force linearly in the x-direction between the first and the second proof mass. In y-acceleration, the coupling structure 33 synchronizes the movement of the first and second proof masses by storing, in a first phase of the in-plane anti-phase rotation, the kinetic energy of the first and second proof masses as elastic energy, and then transferring this elastic energy back to the first and second proof masses in an opposite second phase of the in-plane anti-phase rotation.

In z-acceleration the coupling structure 33 synchronizes the movement of the first and second proof masses by storing, in a first phase of the out-of-plane anti-phase rotation, the kinetic energy of the first and second proof masses as elastic energy, and then transferring this elastic energy back to the first and second proof masses in an opposite second phase of the out-of-plane anti-phase rotation.

In addition to facilitating the desired modes of accelerating movement described above, the suspension structures and the coupling structure may resist undesired motion. For example, the stiffness of the coupling structure in the x-direction may prevent the first and second proof masses from moving linearly in opposite directions along the x-axis. On the other hand, in z-acceleration the flexibility of the coupling structure in bending for out-of-plane rotation together with its stiffness in displacing both ends in opposite directions may prevent synchronization of motion where the two proof masses rotate in the same out-of-plane direction about the first and second horizontal axes, respectively.

In y-acceleration, the flexibility of the coupling structure in bending for in-plane rotation together with its stiffness in displacing both ends in opposite directions may prevent synchronization of motion where the two proof masses rotate in the same in-plane direction about the first and second vertical axes, respectively. Finally, the suspension structures may be given a sufficiently thick height in the z-direction to resist bending in the yz-plane along their lengthwise dimension, so that the suspension structure resists out-of-plane deflection and rotation of the first and second proof masses in opposite directions about the x-axis.

It is noted that it will not always be possible to achieve suspension and coupling structures that allow (and, in the case of the coupling structure, synchronize) all the desired modes of movement while still effectively resisting vibrations and undesired motion and minimizing cross-axis coupling. The flexibility of the suspension structures will usually limit robustness and measurement accuracy to some extent. Nevertheless, careful optimization gives an accelerometer which achieves sufficiently accurate measurements for all three directions while consuming little surface area.

Measurement Configurations

According to various exemplary aspects, any of the following measurement configurations can be used if the accelerometer is an accelerometer for measuring acceleration in the direction of the x-axis, the y-axis and the z-axis. Any of them can also be used if the accelerometer is an accelerometer for measuring acceleration in the direction of the x-axis and the y-axis, but the z-axis measurement may in this case be omitted. They also apply if the accelerometer is an accelerometer for measuring acceleration in the direction of the x-axis and the z-axis, but the y-axis measurement may in this case be omitted. They also apply if the accelerometer is an accelerometer for measuring acceleration in the direction of the y-axis and the z-axis, but the x-axis measurement may in this case be omitted.

The movement of the first and second proof masses in response to x-, y- and z-acceleration can be measured for example with capacitive transducers. Each capacitive transducer may comprise a set of rotor electrodes formed on one of the proof masses paired with a corresponding set of fixed stator electrodes attached to a fixed structure which is adjacent to the proof mass. Output signals can then be measured in capacitance measurements between the rotor and stator electrodes. The rotor and stator electrodes that lie in the device plane may be arranged in a comb geometry where each rotor electrode comb is interdigitated with a corresponding stator electrode comb. Out-of-plane measurements may be performed with a parallel plate arrangement where a stator electrode is placed on a surface which is adjacent to the proof mass, and the opposing surface of the proof mass is used as the rotor electrode.

Figure 4A:
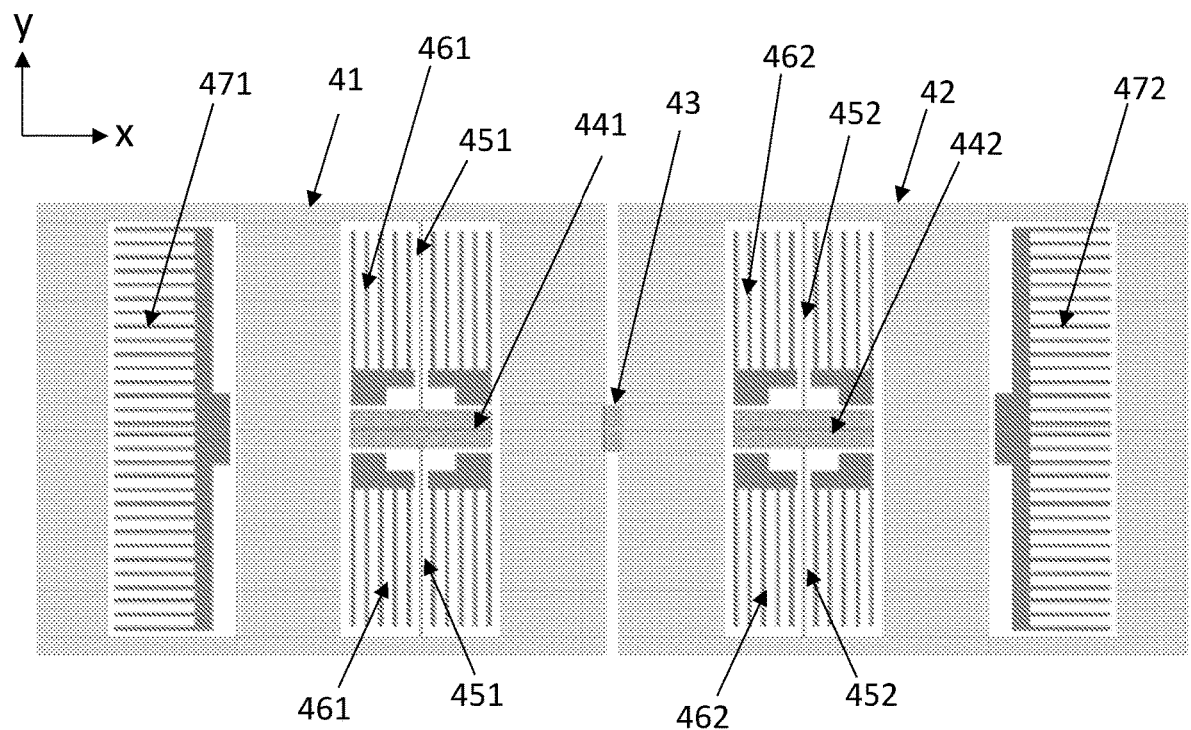
FIGS. 4a-4b illustrate accelerometers with proof masses, suspension and coupling structures and measurement transducers according to exemplary aspects.
Figure 4B:
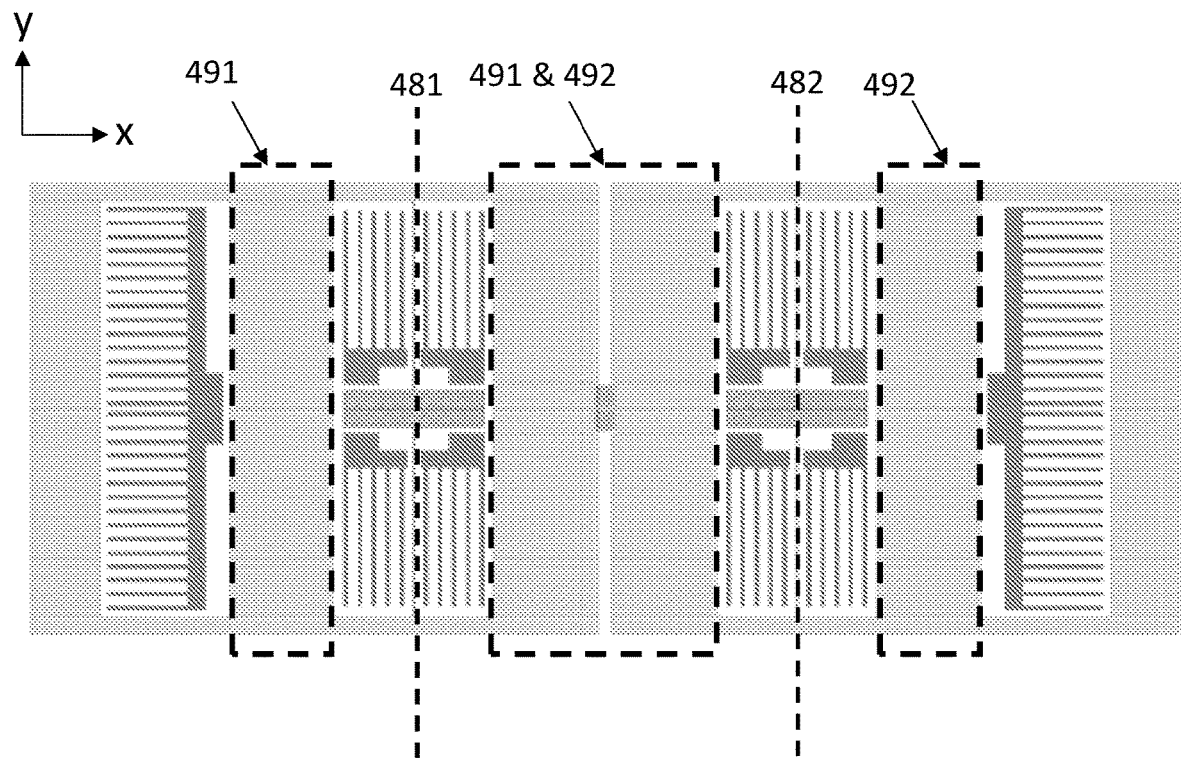

FIGS. 4a-4b illustrate accelerometers where reference numbers 41, 42, 43, 441-442, 451-452 and 481-482 correspond to reference numbers 11, 12, 13, 141-142, 151-152 and 181-182, respectively, in FIGS. 1a-1f. The location of the center of mass here corresponds to the sides illustrated in FIG. 1e. The x-axis transducers 461 and 462 are configured to measure the linear movement of first and second proof masses 41 and 42 in the x-direction when they undergo x-axis acceleration. Only stator electrodes have been illustrated in all transducer illustrations in this disclosure. The corresponding rotor electrodes have been omitted to preserve clarity. The y-axis transducers 471 and 472 are configured to measure the in-plane rotation of first and second proof masses 41 and 42 when they undergo y-axis acceleration.

The x-axis transducers 461 and 462 may be placed closest to the horizontal axes 481/482 of the first and second proof masses. The x-axis transducers 461 that are configured to measure the movement of the first proof mass may be placed symmetrically with respect to the first horizontal axis, and the x-axis transducers 462 which are configured to measure the movement of the second proof mass may be placed symmetrically with respect to the second horizontal axis. The y-axis transducers 471 and 472 may be placed symmetrically with respect to the y-axis 192 illustrated in FIG. 1a. The symmetry options presented in this paragraph apply also to the devices illustrated in FIGS. 5a-7 below.

Out-of-plane rotation can be measured in a parallel-plate arrangement with electrodes that are placed on a surface adjacent to the proof mass in the z-direction, for example, the surface of a surrounding package or support substrate. FIG. 4b illustrates the same accelerometer as FIG. 4a. Reference numbers 491 and 492 illustrate where stator electrodes for z-axis transducers could be placed adjacent to the first and second proof masses, respectively.

The z-axis transducers 491 that are configured to measure the movement of the first proof mass may be placed symmetrically with respect to the first horizontal axis, and the z-axis transducers 492 that are configured to measure the movement of the second proof mass may be placed symmetrically with respect to the second horizontal axis. The z-axis transducers 491 and 492 may together be placed symmetrically with respect to the y-axis 192 illustrated in FIG. 1a, as FIG. 4b illustrates. The same z-axis transducer symmetry could be applied also in FIG. 7.

Figure 4C:
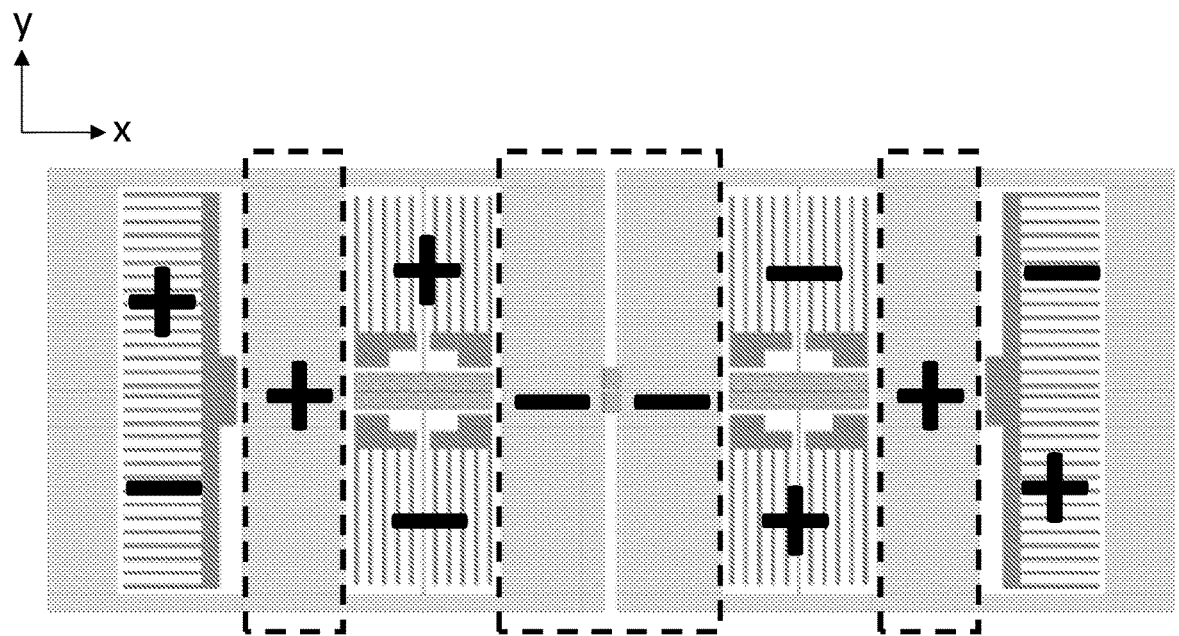
FIG. 4c illustrates differential measurements according to an exemplary aspect.

According to the exemplary aspect, the effect of external vibrations can be at least partially cancelled with differential measurements. The transducers illustrated in FIGS. 4a and 4b can be subdivided into separate electrical transducers. Each plus or minus sign in FIG. 4c can then represent one electrically separated transducer, and the plus/minus sign then indicates how a differential measurement signal may be summed from these x-axis, y-axis and z-axis transducers.

Transducers for measuring the out-of-plane movement of the first and second proof masses can alternatively be measured with interdigitated comb electrodes in the device plane if some stator combs are suitably recessed in the z-direction in relation to the rotor combs they are interdigitated with, and some rotor combs are suitably recessed in the z-direction in relation to the stator combs they are interdigitated with.

Figure 5A:
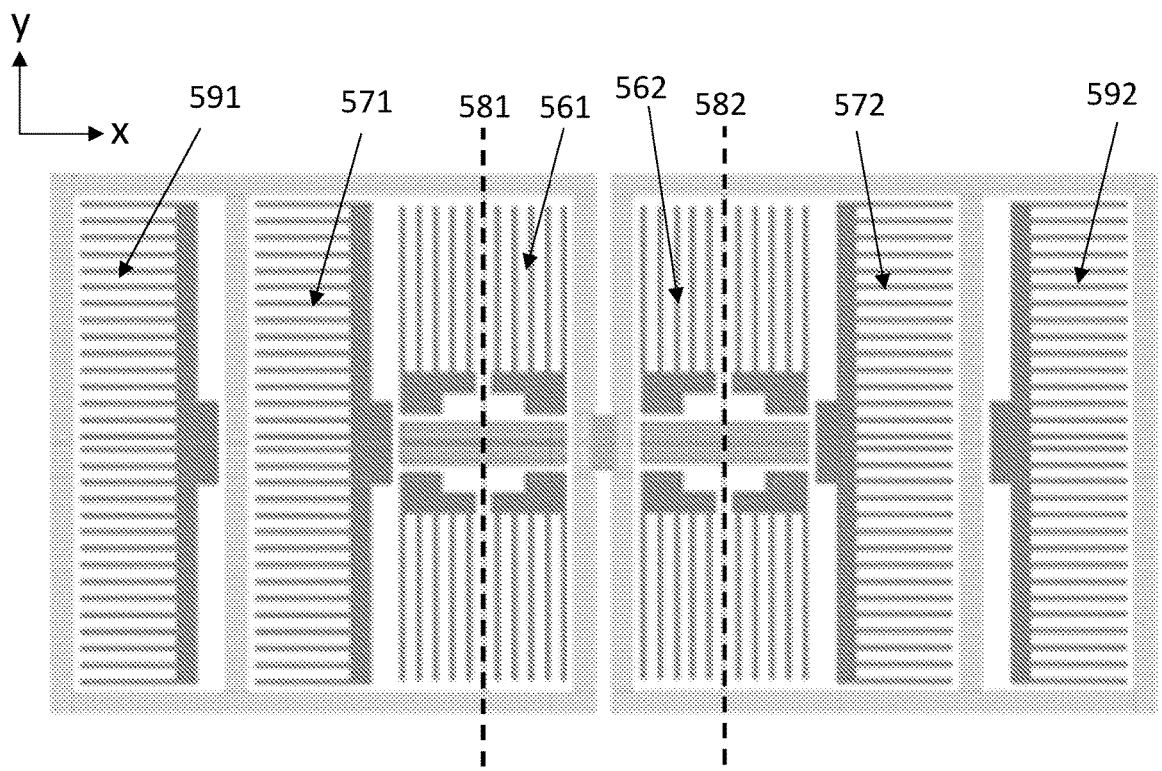
FIGS. 5a-5b illustrate accelerometers with proof masses, suspension and coupling structures and measurement transducers according to exemplary aspects.

FIG. 5a illustrates an accelerometer where reference numbers 561-562 and 571-572 correspond to reference numbers 461-462 and 471-472, respectively, in FIG. 4a, and reference numbers 581-582 correspond to reference numbers 181-182 in FIGS. 1a-1e. Z-axis transducers 591 and 592 are configured to measure the out-of-plane rotation of the first and second proof masses when they undergo z-axis acceleration.

As shown, the x-axis transducers 561 and 562 may be placed closest to the horizontal axes 581/582 of the first and second proof masses. The x-axis transducers which are configured to measure the movement of the first proof mass may be symmetric with respect to the first horizontal axis, and the x-axis transducers which are configured to measure the movement of the second proof mass may be symmetric with respect to the second horizontal axis. Furthermore, the up/down plus-minus symmetry illustrated in FIG. 4c for the x-axis transducers which lie closest to the horizontal axes can alternatively be replaced with a left/right symmetry where the x-axis transducer combs in transducer 561 on the left side of the axis 581 in FIG. 5a are used as a plus-terminal, and the combs in transducer 561 on the right side of 581 are used as a minus-terminal. The x-axis transducer combs in transducer 562 on the left side of the axis 582 in can then be used as a minus-terminal and the combs in transducer 562 on the right side of 582 are used as a plus-terminal.

The z-axis transducers 591 and 592 may be most distant from the horizontal axes 581/582, and they may be symmetric with respect to the y-axis 192 which lies between the proof mass in FIG. 1a. The y-axis transducers 571 and 572 may be placed between the x-axis transducers and the z-axis transducers 591 and 592, as FIG. 5a illustrates, and they may also be symmetrically with respect to the y-axis 192 mentioned above. Similarly, the z-axis transducers 591 and 592 may be placed symmetrically with respect to the y-axis 192.

Figure 5B:
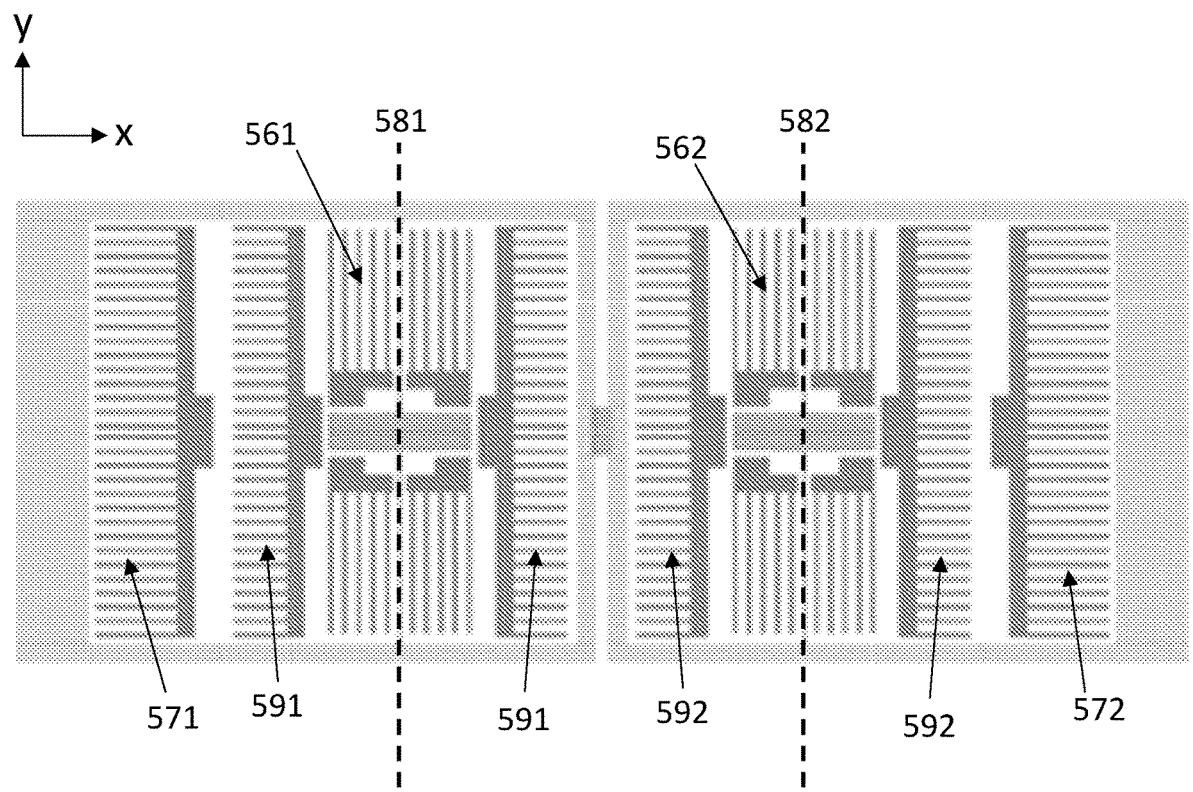

FIG. 5b illustrates an alternative arrangement where the x-axis transducers 561 and 562 are again closest to the horizontal axes 581/582 of the first and second proof masses, but the y-axis transducers 571 and 572 are here most distant from the horizontal axes 581/582. The z-axis transducers 591 that are configured to measure the movement of the first proof mass are placed symmetrically with respect to the first horizontal axis 581, so that one part of the z-axis transducers 591 lies between the y-axis transducers 571 and the x-axis transducers 561. The z-axis transducers 592 that are configured to measure the movement of the second proof mass are placed symmetrically with respect to the second horizontal axis 582, so that one part of the z-axis transducers 592 lies between the y-axis transducers 572 and the x-axis transducers 562. The symmetry of the z-axis transducers with respect to the corresponding horizontal axes allows cross-axis coupling to be compensated even within the z-axis measurements performed on one proof mass.

Figure 6:
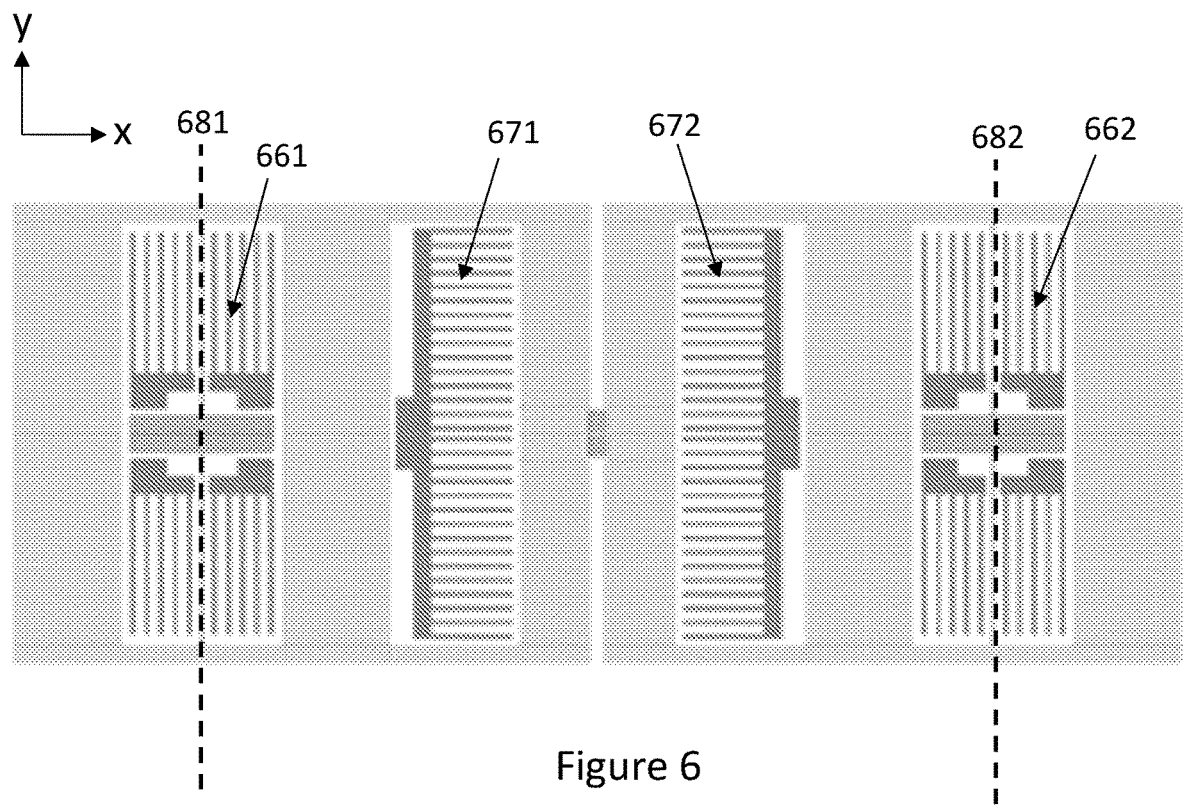
FIGS. 6-7 also illustrate accelerometers with proof masses, suspension and coupling structures and measurement transducers according to exemplary aspects.

FIG. 6 illustrates an accelerometer where reference numbers 661-662, 671-672 and 681-682 correspond to reference numbers 461-462, 471-472 and 481-482, respectively, in FIGS. 4a-4b, but the locations of the centers of mass of the first and second proof masses with respect to their respective horizontal axes here correspond to the sides indicated in FIG. 1a, and the y-axis transducers 671-672 are closer to the y-axis 192 shown in FIG. 1a than the x-axis transducers 661-662.

Figure 7:
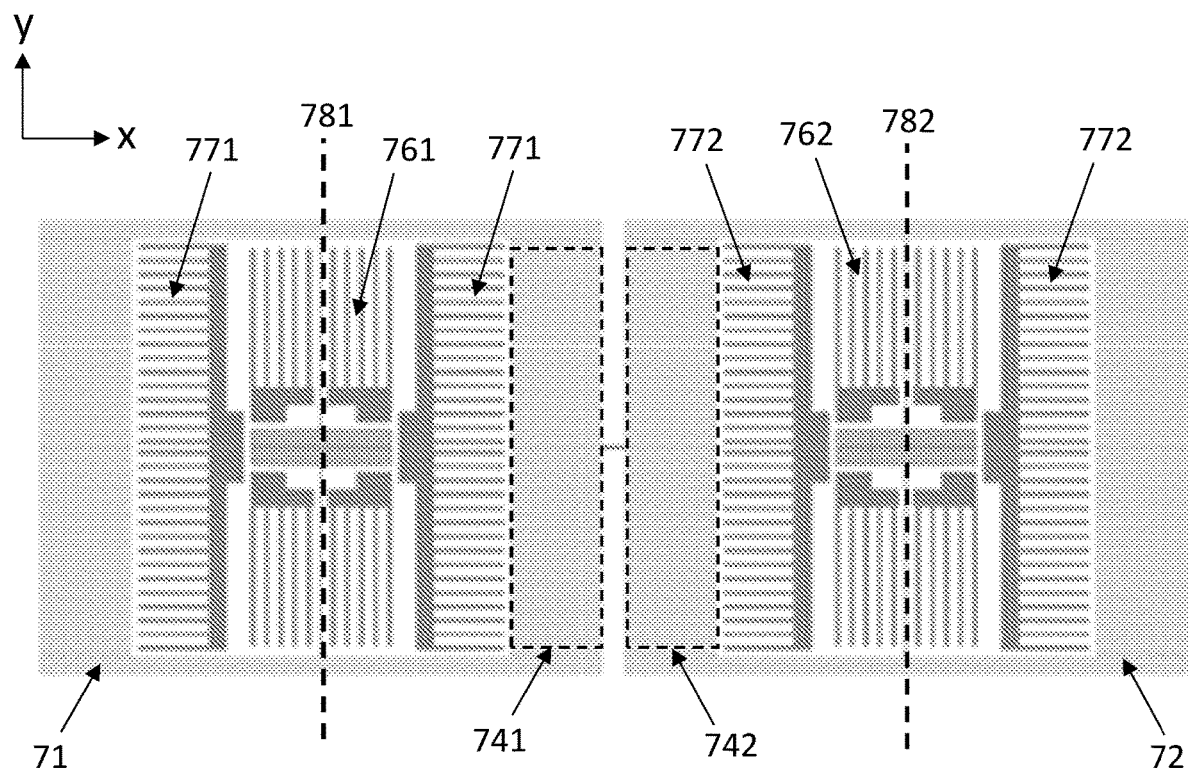

FIG. 7 illustrates an accelerometer where reference numbers 761-762, 771-772 and 781-782 correspond to reference numbers 461-462, 471-472 and 481-482, respectively, in FIGS. 4a-4b. As shown, both the first and the second proof mass 71/72 are symmetric with respect to its rotation axis 781/782, but each proof mass comprises a thinned region 741/742 where the thickness of the proof mass in the z-direction is less than the thickness of the rest of the proof mass. The centers of mass of the first and second proof masses 71 and 72 therefore outside of the horizontal axes as in FIG. 1e. The thinned region could alternatively be placed on the parts of the proof masses which lie one the other side of the rotation axis, and the centers of mass would then instead lie inside of the horizontal axes, as in FIG. 1a.

The y-axis transducers 771 which are configured to measure the movement of the first proof mass are placed symmetrically with respect to the first horizontal axis 781 in FIG. 7, and the y-axis transducers 772 which are configured to measure the movement of the second proof mass are placed symmetrically with respect to the second horizontal axis 782. If the proof masses have been thinned on their bottom side, z-axis transducers (not illustrated in FIG. 7) may be placed adjacent to the top side of the proof masses, and vice versa. Z-axis transducers may be placed symmetrically with respect to the axes 781 and 782, as in FIG. 4b.

What is claimed:

1. An accelerometer for measuring acceleration in at least of two directions of an x-axis, a y-axis and a z-axis, the accelerometer comprising:
    a first proof mass that is suspended from one or more first anchor points by a first suspension structure that configures the first proof mass to undergo linear translation along the x-axis, rotation about a first vertical axis in an xy-plane and rotation about a first horizontal axis out of the xy-plane, with the first vertical axis being perpendicular to the xy-plane and the first horizontal axis being parallel to the y-axis;
    a second proof mass that is suspended from one or more second anchor points by a second suspension structure that configures the second proof mass to undergo linear translation along the x-axis, rotation about a second vertical axis in the xy-plane and rotation about a second horizontal axis out of the xy-plane, with the second vertical axis being perpendicular to the xy-plane and the second horizontal axis being parallel to the y-axis;
    a coupling structure that couples the first proof mass to the second proof mass,
    wherein the first and second proof masses are positioned adjacent to each other and at least partly aligned with each other on the x-axis and lie in the xy-plane in respective rest positions,
    wherein the first proof mass has a center of mass with an x-coordinate that is offset from the first horizontal axis and the second proof mass has a center of mass with an x-coordinate that is offset from the second horizontal axis,
    wherein the coupling structure synchronizes movement of the first and second proof masses so that:
        the first and second proof masses are linearly displaced from the respective rest positions in a same direction parallel to the x-axis when the accelerometer undergoes acceleration in the direction of the x-axis,
        the first proof mass is rotationally displaced from the respective rest position of the first proof mass in the xy-plane about a first vertical axis in a first rotational direction when the accelerometer undergoes acceleration in the direction of the y-axis, and the second proof mass is rotationally displaced from the respective rest position of the second proof mass in the xy-plane about a second vertical axis in a second rotational direction when the accelerometer undergoes acceleration in the direction of the y-axis, with the first rotational direction being opposite to the second rotational direction, and the first proof mass is rotationally displaced from the respective rest position of the first proof mass out of the xy-plane about the first horizontal axis in a first rotational direction when the accelerometer undergoes acceleration in the direction of the z-axis, and the second proof mass is rotationally displaced from the respective rest position of the second proof mass out of the xy-plane about the second horizontal axis in a second rotational direction when the accelerometer undergoes acceleration in the direction of the z-axis, with the first rotational direction being opposite to the second rotational direction.

2. The accelerometer according to claim 1, wherein the first suspension structure comprises a first bendable torsion element and a second bendable torsion element that extend in opposite y-directions from the one or more first anchor points to the first proof mass, and the second suspension structure comprises a third bendable torsion element and a fourth bendable torsion element that extend in opposite y-directions from the one or more second anchor points to the second proof mass.

3. The accelerometer according to claim 1, wherein the x-coordinate of the center of mass of the first proof mass is greater than an x-coordinate of the first horizontal axis and the x-coordinate of the center of mass of the second proof mass is less than an x-coordinate of the second horizontal axis.

4. The accelerometer according to claim 1, wherein the x-coordinate of the center of mass of the first proof mass is less than an x-coordinate of the first horizontal axis and the x-coordinate of the center of mass of the second proof mass is greater than an x-coordinate of the second horizontal axis.

5. The accelerometer according to claim 1, wherein the first proof mass is asymmetric in the xy-plane with respect to the first horizontal axis, and the second proof mass is asymmetric in the xy-plane with respect to the second horizontal axis.

6. The accelerometer according to claim 1, wherein the first proof mass comprises a first thinned region that is asymmetric with respect to the first horizontal axis, and the second proof mass comprises a second thinned region that is asymmetric with respect to the second horizontal axis.

7. The accelerometer according to claim 1, wherein the coupling structure comprises a single spring that is aligned substantially on the x-axis.

8. The accelerometer according to claim 7, wherein the single spring is an elongated beam spring.

9. The accelerometer according to claim 7, wherein the single spring is a box spring.

10. The accelerometer according to claim 7, wherein the single spring is a folded beam spring comprising a plurality of x-subsections that extend in the direction of the x-axis and a plurality of corresponding y-subsections that extend in the direction of the y-axis between the x-subsections.

11. The accelerometer according to claim 1, wherein the coupling structure comprises a first spring and a second spring that lie on opposite sides of the x-axis at substantially a same distance from the x-axis.

12. The accelerometer according to claim 11, wherein both the first spring and the second spring are elongated beam springs.

13. The accelerometer according to claim 11, wherein both the first spring and the second spring are folded beam springs that each comprise a plurality of x-subsections that extend in the direction of the x-axis and a plurality of corresponding y-subsections that extend in the direction of the y-axis between the x-subsections.

14. The accelerometer according to claim 2, wherein the first, second, third and fourth bendable torsion elements are straight torsion bars.

15. The accelerometer according to claim 2, wherein the first, second, third and fourth bendable torsion elements are folded beams.

16. The accelerometer according to claim 15, wherein each folded beam comprises a plurality of y-subbeams that extend in the direction of the y-axis and a plurality of corresponding x-subbeams that extend in the direction of the x-axis between the y-subbeams.

17. An accelerometer for measuring acceleration in at least of two directions of an x-axis, a y-axis and a z-axis, the accelerometer comprising:

a first proof mass that is suspended from one or more first anchor points by a first suspension structure that configures the first proof mass to undergo linear translation along the x-axis, rotation about a first vertical axis in an xy-plane and rotation about a first horizontal axis out of the xy-plane, with the first vertical axis being perpendicular to the xy-plane and the first horizontal axis being parallel to the y-axis;

a second proof mass that is suspended from one or more second anchor points by a second suspension structure that configures the second proof mass to undergo linear translation along the x-axis, rotation about a second vertical axis in the xy-plane and rotation about a second horizontal axis out of the xy-plane, with the second vertical axis being perpendicular to the xy-plane and the second horizontal axis being parallel to the y-axis, and wherein the first and second proof masses are at least partly aligned with each other on the x-axis and lie in the xy-plane when each of the first and second proof masses are in their respective rest positions;

a coupling structure that couples the first proof mass to the second proof mass and that is configured to synchronize movement of the first and second proof masses so that:

the first and second proof masses are linearly displaced from the respective rest positions in a same direction parallel to the x-axis when the accelerometer undergoes acceleration in the direction of the x-axis, the first proof mass is rotationally displaced from the respective rest position of the first proof mass in the xy-plane about a first vertical axis in a first rotational direction when the accelerometer undergoes acceleration in the direction of the y-axis, and the second proof mass is rotationally displaced from the respective rest position of the second proof mass in the xy-plane about a second vertical axis in a second rotational direction when the accelerometer undergoes acceleration in the direction of the y-axis, with the first rotational direction being opposite to the second rotational direction, and the first proof mass is rotationally displaced from the respective rest position of the first proof mass out of the xy-plane about the first horizontal axis in a first rotational direction when the accelerometer undergoes acceleration in the direction of the z-axis, and the second proof mass is rotationally displaced from the respective rest position of the second proof mass out of the xy-plane about the second horizontal axis in a second rotational direction when the accelerometer undergoes acceleration in the direction of the z-axis, with the first rotational direction being opposite to the second rotational direction.

18. The accelerometer according to claim 17, wherein the first proof mass has a center of mass with an x-coordinate that is offset from the first horizontal axis and the second proof mass has a center of mass with an x-coordinate that is offset from the second horizontal axis.

19. The accelerometer according to claim 18, wherein the x-coordinate of the center of mass of the first proof mass is greater than an x-coordinate of the first horizontal axis and the x-coordinate of the center of mass of the second proof mass is less than an x-coordinate of the second horizontal axis.

20. The accelerometer according to claim 18, wherein the x-coordinate of the center of mass of the first proof mass is less than an x-coordinate of the first horizontal axis and the x-coordinate of the center of mass of the second proof mass is greater than an x-coordinate of the second horizontal axis.

* * * * *

UNITED STATES PATENT AND TRADEMARK OFFICE
CERTIFICATE OF CORRECTION

PATENT NO. : 12,474,366 B2  
APPLICATION NO. : 18/154409  
DATED : November 18, 2025  
INVENTOR(S) : Rytkönen et al.

Page 1 of 1

It is certified that error appears in the above-identified patent and that said Letters Patent is hereby corrected as shown below:

In the Claims

In Column 16, Lines 27-28:  
Reads: "in at least of two directions of"  
Should Read: --in at least two directions of--

In Column 18, Lines 21-22:  
Reads: "in at least of two directions of"  
Should Read: --in at least two directions of--

Signed and Sealed this  
Tenth Day of February, 2026

John A. Squires  
*Director of the United States Patent and Trademark Office*